US011928721B2

United States Patent
Chow et al.

(10) Patent No.: US 11,928,721 B2
(45) Date of Patent: *Mar. 12, 2024

(54) RECOMMENDATION ENGINE THAT UTILIZES TRAVEL HISTORY TO RECOMMEND VEHICLES FOR CUSTOMERS

(71) Applicant: Capital One Services, LLC, McLean, VA (US)

(72) Inventors: Chih-Hsiang Chow, Plano, TX (US); Steven Dang, Plano, TX (US); Elizabeth Furlan, Plano, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/845,247

(22) Filed: Jun. 21, 2022

(65) Prior Publication Data

US 2022/0318883 A1 Oct. 6, 2022

Related U.S. Application Data

(63) Continuation of application No. 16/901,196, filed on Jun. 15, 2020, now Pat. No. 11,367,121.

(51) Int. Cl.
| | | |
|---|---|---|
| *G06Q 30/06* | (2023.01) | |
| *G01C 21/34* | (2006.01) | |
| *G06F 16/906* | (2019.01) | |
| *G06Q 30/0601* | (2023.01) | |
| *G06Q 40/08* | (2012.01) | |
| *G06N 20/00* | (2019.01) | |

(52) U.S. Cl.
CPC ..... *G06Q 30/0631* (2013.01); *G01C 21/3484* (2013.01); *G01C 21/3492* (2013.01); *G06F 16/906* (2019.01); *G06Q 40/08* (2013.01); *G06N 20/00* (2019.01)

(58) Field of Classification Search
CPC .............. G06Q 30/0631; G06F 16/906; G01C 21/3484; G01C 21/3492
See application file for complete search history.

(56) References Cited

U.S. PATENT DOCUMENTS

| | | | |
|---|---|---|---|
| 7,406,436 B1 | 7/2008 | Reisman | |
| 9,953,372 B1* | 4/2018 | Dziabiak | ................. G06Q 40/08 |
| 10,599,155 B1* | 3/2020 | Konrardy | .............. B60W 10/04 |
| 10,630,723 B1* | 4/2020 | Prasad | .................. H04L 63/166 |

(Continued)

FOREIGN PATENT DOCUMENTS

WO  WO 2018201979 A1  11/2018

*Primary Examiner* — Scott C Anderson
(74) *Attorney, Agent, or Firm* — Sterne, Kessler, Goldstein & Fox P.L.L.C.

(57) ABSTRACT

The disclosure describes a system and methods for implementing a recommendation engine. The recommendation engine can at least receive a travel history log, wherein the travel history log includes a route traversed by a customer; receive a route information from a database for the route, where the route information includes an accident history for the route; generate a route traverse percentage based on the travel history log; generate a route categorization score based on the accident history for the route and the route traverse percentage; and generate a vehicle recommendation based on the route categorization score.

20 Claims, 4 Drawing Sheets

(56) References Cited

U.S. PATENT DOCUMENTS

| | | |
|---|---|---|
| 11,030,904 B2 | 6/2021 | Tang et al. |
| 11,367,121 B2 | 6/2022 | Chow et al. |
| 2014/0129080 A1 | 5/2014 | Leibowitz et al. |
| 2015/0120489 A1 | 4/2015 | Edelman |
| 2016/0198306 A1 | 7/2016 | Miles et al. |
| 2016/0292768 A1 | 10/2016 | Needham |
| 2018/0158340 A1 | 6/2018 | de Moura |
| 2019/0279502 A1 | 9/2019 | Fowe |
| 2019/0311404 A1 | 10/2019 | Wasserman et al. |
| 2021/0201416 A1 | 7/2021 | Bermudez |

\* cited by examiner

RECOMMENDATION ENGINE THAT UTILIZES TRAVEL HISTORY TO RECOMMEND VEHICLES FOR CUSTOMERS

CROSS-REFERENCE TO RELATED APPLICATIONS

This application is a continuation of U.S. application Ser. No. 16/901,196, filed Jun. 15, 2020, the contents of which is incorporated by reference herein in its entirety.

TECHNICAL FIELD

The present disclosure relates to a computing system, specifically a recommendation engine utilizing travel histories to recommend vehicles for customers.

BACKGROUND

By understanding consumer behaviors demonstrated in the consumer's driving patterns, useful insights are drawn about what vehicles meet the needs of a consumer, specifically about which vehicles meet the day-to-day needs of the consumer. These insights can be used to more accurately predict consumer vehicle preferences without the need for consumers to initiate a search for a vehicle. Accordingly, there remains a need for improved techniques for detecting consumer driving patterns and the ability to make recommendations based on the driving patterns without the need for human intervention.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a skilled artisan to make and use the disclosure.

DETAILED DESCRIPTION

Figure 1:
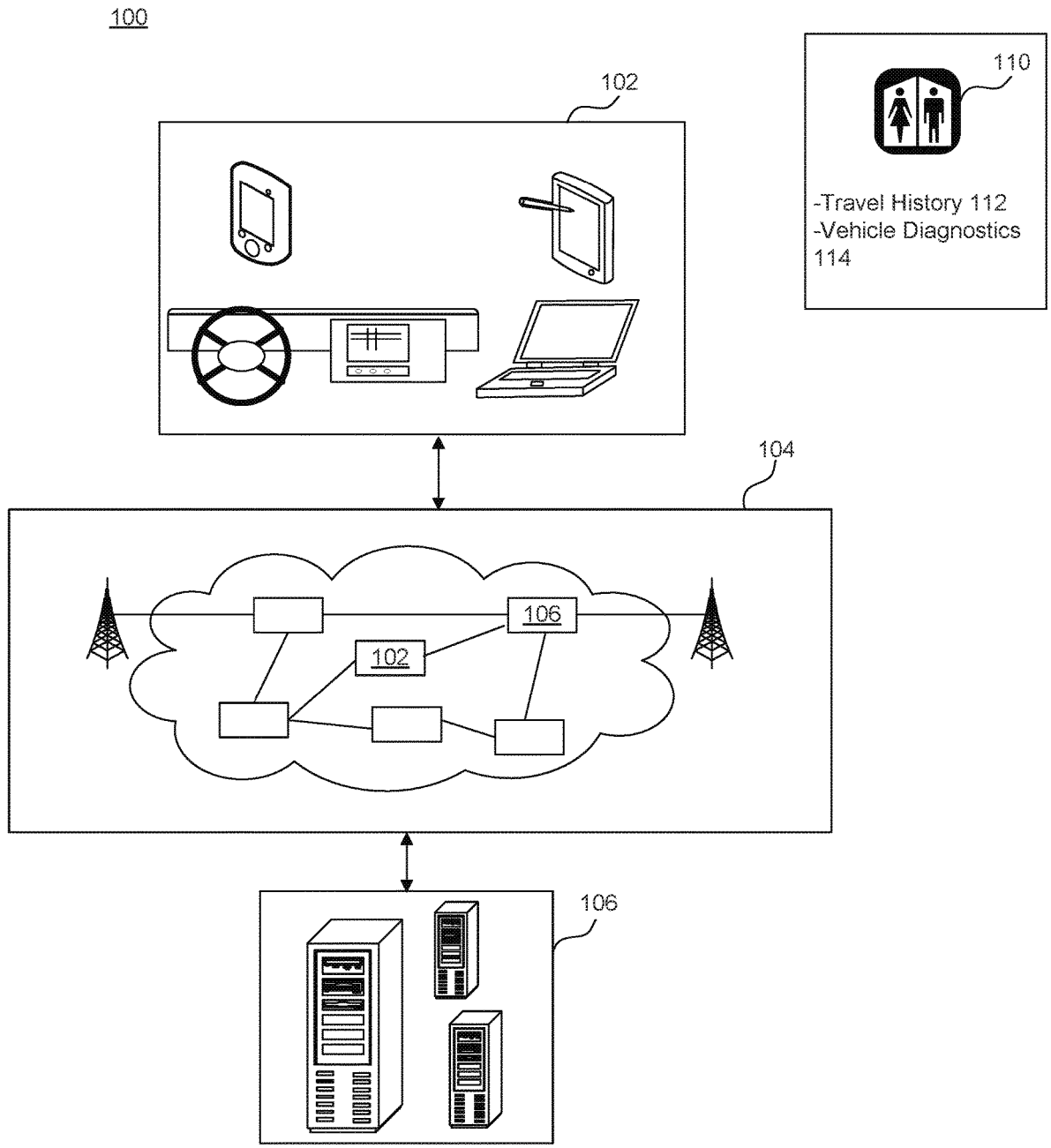
FIG. 1 is an example system in which a recommendation engine that utilizes travel histories to recommend vehicles for a customer operates according to an embodiment.

The following embodiments are described in sufficient detail to enable a skilled artisan to make and use the present disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the embodiments. However, it will be apparent that embodiments may be practiced without these specific details. In order to avoid obscuring an embodiment, some well-known circuits, system configurations, and process steps are not disclosed in detail.

The drawings showing embodiments are semi-diagrammatic and not to scale. Some of the dimensions are for the clarity of presentation and are shown exaggerated in the drawings. Similarly, although the views in the drawings are for ease of description and generally show similar orientations, this depiction in the figures is arbitrary for the most part. Generally, the system can be operated in any orientation.

Certain embodiments have other steps or elements in addition to or in place of those mentioned. The steps or elements will become apparent to those skilled in the art from a reading of the following detailed description when taken with reference to the accompanying drawings.

The term "module" or "unit" referred to herein includes software, hardware, or a combination thereof in an embodiment in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims, the module or unit is deemed to include hardware circuitry for the purposes and the scope of the system or apparatus claims.

The modules and units in the following description of the embodiments can couple to one another as described or as shown. The coupling can be direct or indirect, without or with intervening items between coupled modules or units. The coupling can be by physical contact or by communication between modules or units.

FIG. 1 shows an example system 100 in which a recommendation engine that utilizes travel histories to recommend vehicles for a customer 110 operates according to an embodiment. The recommendation engine refers to a device, module, unit, or combination thereof designed to recommend vehicles for purchase, lease, or rent to a customer 110 based on determining what vehicles suit the driving needs of the customer 110. The customer 110 refers to a person looking to purchase, lease, or rent a vehicle. A vehicle refers to a car, truck, motorcycle, scooter, or bicycle, as examples.

In one embodiment, the recommendation engine can recommend vehicles based on a travel history 112 of the customer 110. The travel history 112 includes information regarding where the customer 110 has traveled to and from, what travel routes were taken and information related to the travel routes, and what times the routes were taken, as examples. For example, the information related to the travel routes can further include information regarding accidents along the routes, the types of vehicles involved in the accidents, weather conditions along the routes or in the general area customer 110 lives, road conditions along the routes, or traffic conditions along the routes, as examples. In one embodiment, the recommendation engine can obtain the travel history 112 from the devices of the system 100, for example a first device 102, a second device 106, or a combination thereof. In one embodiment, the recommendation engine can further obtain the travel history 112 in conjunction with third-party services that collect information regarding the customer 110 location or that can track the customer 110 movements, such as location based tracking services or map based services such as Google Maps™ or Apple Maps™, as examples. Additionally, in one embodiment, the recommendation engine can further obtain information regarding the travel routes from databases or repositories that provide the information related to the travel routes, including databases or repositories providing information about accidents along the routes, the types of vehicles involved in the accidents, weather conditions along the routes, road conditions along the routes, or traffic conditions along the routes, as examples. These can include police report servers or websites, historic archives, records maintained by a municipality, databases of historic weather patterns with information about weather along the routes or in geographic regions, or a combination thereof, as examples. In yet one more example, the recommendation engine can supplement its analysis based on other persons in the general same area based on similar travel patterns (e.g., the additional person lives and works in the same general area).

In a multi-device implementation, the system 100 can, in one embodiment, include a first device 102, such as a client device or a server, connected to a second device 106, such as a client device or server. In one embodiment, the recommendation engine can be integrated with the first device 102, the second device 106, or a combination thereof and operate by having its functionality implemented using one or more components of the first device 102, the second device 106, or a combination thereof. In one embodiment, the first device 102 and the second device 106 can communicate with each other through a communication path 104, such as a wired or wireless network.

The first device 102 can be of any of a variety of devices, such as a smart phone, a cellular phone, a personal digital assistant, a tablet computer, a notebook computer, a laptop computer, a desktop computer, a vehicle on-board diagnostic (OBD) system, or a vehicle integrated navigation system. In one embodiment, the first device 102 can collect, receive, or generate information regarding the travel history 112. In one embodiment, if functioning as part of a vehicle OBD system or a vehicle integrated navigation system, the first device 102 can further collect, receive, or generate a vehicle diagnostics information 114, which can further be used by the recommendation engine in conjunction with the travel history 112 to make vehicle recommendations to the customer 110. The vehicle diagnostics information 114 can include tire pressure information, oil level information, miles traveled, or fluid levels, as examples. In one embodiment, the vehicle diagnostics information 114 can be obtained by one or more vehicle sensors integrated with the vehicle and designed to obtain the vehicle diagnostics information 114. In one embodiment, the vehicle diagnostics information 114 can be sent by the vehicle sensors to the first device 102.

The first device 102 can collect, receive, or generate the travel history 112, vehicle diagnostics information 114, or a combination thereof via one or more units or modules integrated with or accessed by the first device 102. Such units or modules can include, for example, components of a global positioning system (GPS), including hardware, software, or map data, vehicle sensors, or a combination thereof. In one embodiment, once collected, received, or generated, the travel history 112, the vehicle diagnostics information 114, or a combination thereof can be stored in a memory device, a computer file, a table, or a data structure in a computer program on one or more devices of the system 100, for example the first device 102, the second device 106, or a combination thereof.

The first device 102 can either couple directly or indirectly to the communication path 104 to communicate with the second device 106, or can be a stand-alone device. Stand-alone refers to a device being able to work and operate independently of the other devices of the system 100. In one embodiment, the first device 102 can send the travel history 112, the vehicle diagnostics information 114, or a combination thereof collected, received, or generated to the second device 106 for further processing and to implement the functionality of the recommendation engine.

The second device 106 can be any of a variety of centralized or decentralized computing devices. For example, the second device 106 can be a laptop computer, a desktop computer, grid-computing resources, a virtualized computing resource, cloud computing resources, routers, switches, peer-to-peer distributed computing devices, a server, a server farm, or a combination thereof. The second device 106 can be centralized in a single room, distributed across different rooms, distributed across different geographic locations, or embedded within a telecommunications network. The second device 106 can couple with the communication path 104 to communicate with the first device 102, or can be a stand-alone device.

For brevity of description in the embodiments discussed below, the first device 102 will be described as a client device, and the second device 106 will be described as a server device. It is understood, however, that the system 100 can have the first device 102 as a different type of device. For example, the first device 102 can be a server. Also for illustrative purposes, the system 100 is shown with the second device 106 as a server, although it is understood that the system 100 can have the second device 106 as a different type of device. For example, the second device 106 can be a client device.

Also for illustrative purposes, the system 100 is shown with the first device 102 and the second device 106 as end-points of the communication path 104, although it is understood that the system 100 can have a different partition between the first device 102, the second device 106, and the communication path 104. For example, the first device 102 and the second device 106 can also function as part of the communication path 104.

The communication path 104 can span and represent a variety of networks and network topologies. For example, the communication path 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
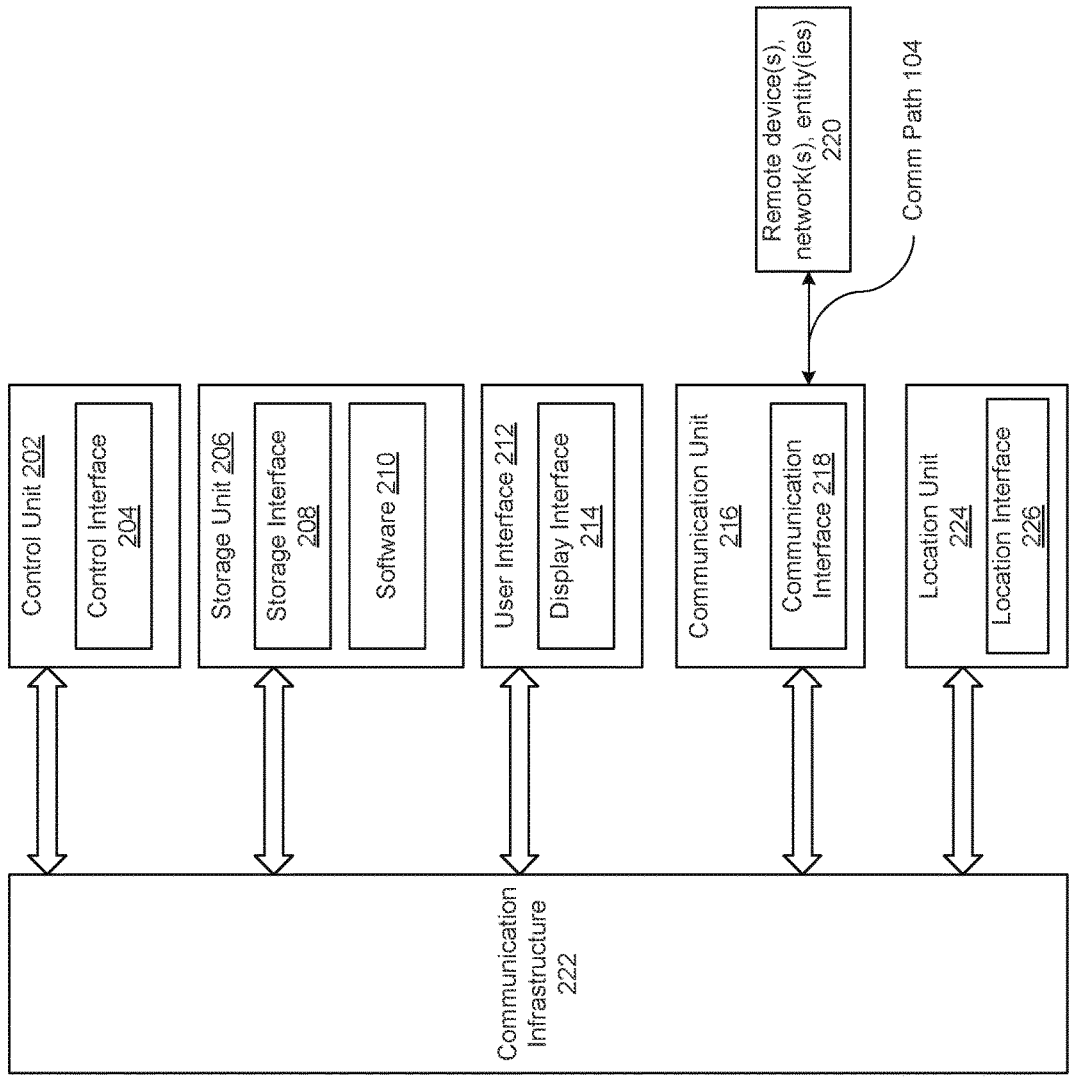
FIG. 2 is an example block diagram of the components of the system according to an embodiment.

FIG. 2 shows an example block diagram 200 of the components of the system 100 according to an embodiment. The components shown can be implemented on any of the devices of the system 100. For example, the components can be implemented in the first device 102 or the second device 106.

In one embodiment, the components can include a control unit 202, a storage unit 206, a user interface 212, a communication unit 216, and a location unit 224. The control unit 202 can include a control interface 204. The control unit 202 can execute a software 210 to provide some or all of the intelligence of the system 100. The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 204 can be used for communication between the control unit 202 and other functional units or devices of the system 100. The control interface 204 can also be used for communication that is external to the functional units or devices of the system 100. The control interface 204 can also receive information from the functional units or devices of the system 100, or from remote devices 220, or can transmit information to the functional units or devices of the system 100, or to remote devices 220. The remote devices 220 refer to functional units or devices external to the system 100.

The control interface 204 can be implemented in different ways and can include different implementations depending on which functional units or devices of the system 100, or remote devices 220 are being interfaced with the control unit 202. For example, the control interface 204 can be implemented with a pressure sensor, an inertial sensor, a microelectromechanical system (MEMS), optical circuitry, waveguides, wireless circuitry, wireline circuitry to attach to a bus, an application programming interface (API), or a combination thereof. The control interface 204 can be connected to a communication infrastructure 222, such as a bus, to interface with the functional units or devices of the system or remote devices 220.

The storage unit 206 can store the software 210. For illustrative purposes, the storage unit 206 is shown as a single element, although it is understood that the storage unit 206 can be a distribution of storage elements. Also for illustrative purposes, the storage unit 206 is shown as a single hierarchy storage system, although it is understood that the storage unit 206 can be in a different configuration. For example, the storage unit 206 can be formed with different storage technologies forming a memory hierarchal system including different levels of caching, main memory, rotating media, or off-line storage. The storage unit 206 can be a volatile memory, a nonvolatile memory, an internal memory, an external memory, or a combination thereof. For example, the storage unit 206 can be a nonvolatile storage such as nonvolatile random access memory (NVRAM), Flash memory, disk storage, or a volatile storage such as static random access memory (SRAM) or dynamic random access memory (DRAM).

The storage unit 206 can include a storage interface 208. The storage interface 208 can be used for communication between the storage unit 206 and other functional units or devices of the system 100. The storage interface 208 can also be used for communication that is external to the system 100. The storage interface 208 can receive information from the other functional units or devices of the system 100 or from remote devices 220, or can transmit information to the other functional units or devices of the system 100 or to remote devices 220. The storage interface 208 can include different implementations depending on which functional units or devices of the system 100, or remote devices 220, are being interfaced with the storage unit 206. The storage interface 208 can be implemented with technologies and techniques similar to the implementation of the control interface 204.

The communication unit 216 can enable communication to devices of the system 100 or to remote devices 220. For example, the communication unit 216 can permit the first device 102 to communicate with the second device 106. The communication unit 216 can further permit the devices of the system 100 to communicate with remote devices 220 such as an attachment or a peripheral device, through the communication path 104. The communication unit 216 can also function as a communication hub allowing the first device 102 or the second device 106 to function as part of the communication path 104 and not be limited to be an end point or terminal unit to the communication path 104. The communication unit 216 can include active and passive components, such as microelectronics or an antenna, for interaction with the communication path 104.

The communication unit 216 can include a communication interface 218. The communication interface 218 can be used for communication between the communication unit 216 and other functional units or devices of the system 100 or to remote devices 220. The communication interface 218 can receive information from the other functional units or devices of the system 100, or from remote devices 220, or can transmit information to the other functional units or devices of the system 100 or to remote devices 220. The communication interface 218 can include different implementations depending on which functional units or devices are being interfaced with the communication unit 216. The communication interface 218 can be implemented with technologies and techniques similar to the implementation of the control interface 204.

The user interface 212 can present information generated by the system 100. In one embodiment, the user interface 212 allows a user of the system 100 to interface with the devices of the system 100 or remote devices 220. The user interface 212 can include an input device and an output device. Examples of the input device of the user interface 212 can include a keypad, buttons, switches, touchpads, soft-keys, a keyboard, a track pad, or any combination thereof to provide data and communication inputs. Examples of the output device can include a display interface 214. The control unit 202 can operate the user interface 212 to present information generated by the system 100. The control unit 202 can also execute the software 210 to present information generated by the system 100, or to control other functional units of the system 100. The display interface 214 can be any graphical user interface such as a display, a projector, a video screen, or any combination thereof.

The location unit 224 can generate location information, current heading, and current speed of the devices of the system 100, for example the first device 102. The location unit 224 can be implemented in many ways. For example, the location unit 224 can function as at least a part of a global positioning system (GPS) and can include components, such as a GPS receiver, an inertial navigation system, a cellular-tower location system, or any combination thereof.

The location unit 224 can include a location interface 226. The location interface 226 can be used for communication between the location unit 224 and other functional units in the system 100. The location interface 226 can also be used for communication that is external to the devices of the system 100, such as to remote devices 220. The location interface 226 can be implemented with technologies and techniques similar to the implementation of the control interface 204.

The components can be optimized for implementing an embodiment in a multi-device embodiment wherein the first device 102 and the second device 106 are required to implement the one or more functions of the system 100. For example, if the first device 102 and the second device 106 are to each provide some functionality of the system 100, the control unit 202 of either the first device 102 or the second device 106 can execute the software 210 of the first device 102, the second device 106, or a combination thereof to implement the functionality of the system 100.

For illustrative purposes, the system 100 is described by operation of the first device 102 and the second device 106. It is understood that the first device 102 or the second device 106 can operate any of the modules, units, and functions of the system 100.

Figure 3:
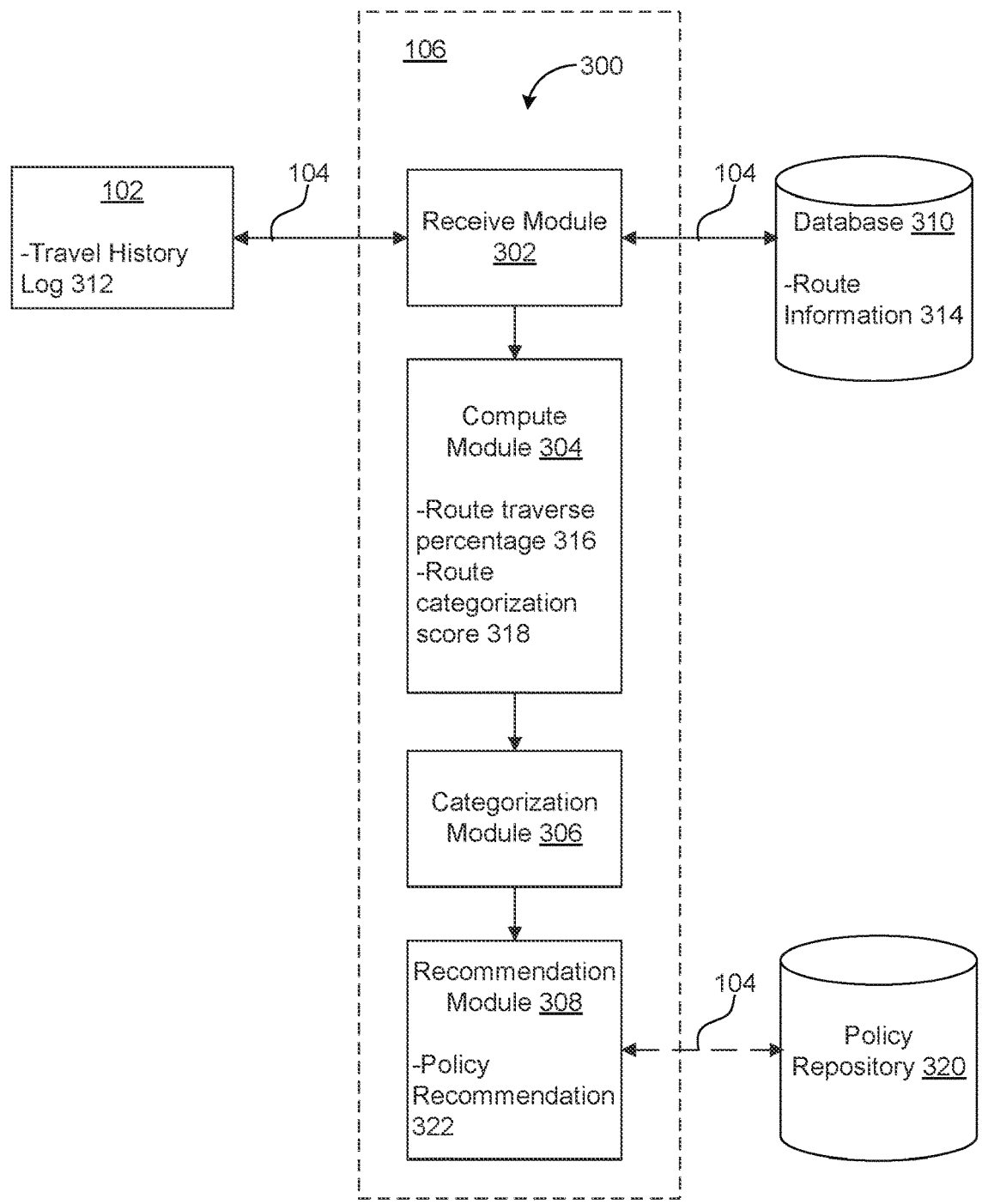
FIG. 3 is an example control flow of the recommendation engine according to an embodiment.

FIG. 3, shows an example control flow 300 of the recommendation engine according to an embodiment. FIG. 3 shows the control flow 300 implemented with modules and sub-modules that are operated, stored on, and executed by the second device 106. This is merely exemplary and done for ease of description. In other embodiments, other devices such as the first device 102 can execute some or all of the operations of the modules and sub-modules.

In one embodiment, the control flow 300 can include a receive module 302, a compute module 304, a categorization module 306, and a recommendation module 308. In one embodiment, the receive module 302 can communicatively couple to the compute module 304. The compute module 304 can communicatively couple to the categorization module 306. The categorization module 306 can communicatively couple to the recommendation module 308.

The receive module 302 enables the receipt of the travel history 112, vehicle diagnostics information 114, or a combination thereof. In one embodiment, the travel history 112, the vehicle diagnostics information 114, or a combination thereof can be stored in a travel history log 312. The travel history log 312 refers to a computer file, database, repository, or data structure containing the information or data associated with the travel history 112, the vehicle diagnostics information 114, or a combination thereof. In one embodiment, the travel history log 312 can include entries based on the travel history 112, the vehicle diagnostics information 114, or a combination thereof. For example, the travel history log 312 can include entries for destinations traveled to and from, what routes were traversed or taken, the distance travelled for each route, and the time in route, as examples. In one embodiment, the travel history log 312 can further include entries for the vehicle diagnostics information 114 during each route. For example, for each route traversed or taken, can exist regarding how many times the customer 110 made stops along the route, how many right/left turns were made, or what the average speed of the vehicle along the route was, as examples. In one embodiment, the travel history log 312 can be based on a chronology of trips made by the customer 110 over a period of time, for example, over a period of "X" days, weeks, months, or years, where "X" is an integer, and where the travel history log 312 contains entries for each trip the customer 110 has taken over the period of time.

In one embodiment, the receive module 302, based on receipt of the travel history log 312, can access and enable the receipt of a route information 314 from a database 310 for the entries in the travel history log 312. The route information 314 includes information or data related to the routes, for example, the number of accidents along the routes, the types of vehicles involved in the accidents, weather conditions along the routes, road conditions along the routes, or traffic conditions along the routes, as examples. In one embodiment, the route information 314 can be stored on the database 310 from which the receive module 302 can access and receive the route information 314.

The database 310 refers to any storage or repository storing the route information 314. The database 310 can be implemented using the same technologies as the storage unit 206, or can be implemented as a relational database, SQL database, or similar technologies. In one embodiment, the database 310 can be external to the system 100. In one embodiment, the database 310 can be part of the system 100. While shown as a single storage element in FIG. 3, in other embodiments the database 310 can be a distribution of storage elements or repositories on which the route information 314 can be stored. Examples of a distribution of storage elements or repositories includes public or privately available sources such as police report servers, historic archives, records maintained by a municipality, databases of historic weather patterns with information about weather along the routes or in geographic regions, or a combination thereof, as examples, that can be accessed by the receive module 302 via the communication path 104. In one embodiment, the receive module 302 can access and receive the route information 314 from the database 310 over the communication path 104, for example using an application programming interface (API) to access the route information 314 via the communication path 104.

In one embodiment, once the receive module 302 performs its functions, the receive module 302 can pass the route information 314 and control to the compute module 304 for further processing. The compute module 304 enables the generation of one or more scores or values that form the basis from which the recommendation engine makes its recommendation to the customer 110. Examples of scores and values will be described below.

For example, in one embodiment, the compute module 304 can generate a route traverse percentage 316. The route traverse percentage 316 refers to a value or set of values indicating the percentage, over a period of time, that the customer 110 traverses or takes a particular route. In other words, the route traverse percentage 316 indicates what routes the customer 110 takes over a period of time as a percentage. The purpose of the route traverse percentage 316 is to determine what types of road conditions the customer 110 frequently encounters. Based on the route traverse percentage 316, the recommendation engine is capable of making custom recommendations to the customer 110 as to which vehicle will meet the driving needs of the customer 110.

In one embodiment, the route traverse percentage 316 can be generated based on a period of time, for example "X" a days, weeks, months, or years, where "X" is an integer. By way of example, if the period of time is one week, the compute module 304 can determine what percent of time the customer 110 takes for each route listed in the travel history log 312 over the one week period. In one embodiment, the route traverse percentage 316 can be determined by counting the number of times a particular route was taken over the course of the period of time and dividing the number by the total number of trips over the period of time. In this manner, each route will have an associated percentage. For example, if the customer 110 has taken ten trips during a one week period, and has taken three different routes for the ten trips, for example "ROUTE A," "ROUTE B," "ROUTE C," where "ROUTE A" was taken three times, "ROUTE B" was taken four times, and "ROUTE C" was taken three times, the route traverse percentage 316 for "ROUTE A" is 30%, "ROUTE B" is 40%, and "ROUTE C" is 30%.

In one embodiment, the compute module 304 can further generate a route categorization score 318. The route categorization score 318 refers to a value or set of values characterizing each route entry of the travel history log 312. The route categorization score 318 can be determined based on the route information 314. The purpose of the route categorization score 318 is to generate a value or set of values for each route such that each route can be characterized or profiled using quantified values. The generation of the route categorization score 318 will be described below by way of example.

By way of example, and as previously mentioned, each route in the travel history log 312 can have a route information 314 associated with it. For example, the route information 314 can be the number of accidents along the route, weather conditions along the route, road conditions along the route, traffic conditions along the route, as examples. In one embodiment, each instance of the route information 314 can have a value associated with it. In the case of accidents along the route, the value can be, for example, "X" accidents along the route, where "X" is an integer. In the case of weather conditions, the weather conditions can be categorized using pre-determined categories such as "SEVERE," "MILD," "TEMPERATE," or "CLEAR," as examples, and each of these categories can have a numerical value or code associated with them, for example "SEVERE" can have a value of "X1", "MILD" can have a value of "X2," etc., where "X1," "X2," etc. are real numbers or codes. In the case of road conditions, similar to the values or codes associated with the weather conditions, the road conditions can be categorized in pre-determined categories such as "POOR," "NEEDS REPAIR," or "NEW," as examples, and each of these categories can have a numerical value or code associated with it. In the case of traffic conditions along the routes, the traffic conditions similar to the values or codes of the weather and road conditions, can also be categorized in pre-determined categories such as "LIGHT," "MODERATE," "HEAVY," as examples, and each of these categories can have a numerical value or code associated with it.

In one embodiment, the compute module 304 can generate the values or codes for the instances of the route information 314. For example, in the case of weather conditions, road conditions, or traffic conditions, the compute module 304, based on the information in the travel history log 312 can generate the values or codes representing the weather conditions, road conditions, or traffic conditions, by for example, performing a conversion between the pre-determined categories and the numerical values or codes. For example, in one embodiment, the compute module 304 can parse the travel history log 312 and if a text or value is encountered for a route entry which lists the weather conditions as being "SEVERE," based on the categorization, the compute module 304 can map the "SEVERE" weather category to an associated numerical value or code. Such mapping can be done, for example, with the use of a lookup table with associated numerical values or codes for the category. A similar process can be performed for the road conditions or traffic conditions. In one embodiment, the values or set of values for the route information 314 can be obtained directly from a text or value listed in the travel history log 312. For example, for the number of accidents along the routes, the number of accidents can be directly obtained from the travel history log 312 listing the same as obtained from, for example, a police database or from records maintained by a municipality and stored in the travel history log 312.

Continuing with the example, in one embodiment, the compute module 304, based on either generating or determining the values or codes for the instances of the route information 314, can generate the route categorization score 318 by for example aggregating the values generated or determined for each instance of the route information 314 a vector or data structure, which in aggregate can constitute the route categorization score 318.

In one embodiment, once the compute module 304 determines or generates the route categorization score 318, the compute module 304 can further refine the route categorization score 318 by factoring in the route traverse percentage 316 into the route categorization score 318. For example, in one embodiment, the compute module 304 can factor in the route traverse percentage 316 by multiplying the route traverse percentage 316 with the route categorization score 318 for each route taken. For example, if the route categorization score 318 is represented as a vector, the vector can be multiplied by the route traverse percentage 316 determined for a route. In this manner, the route categorization score 318 can reflect how much each route should be weighted or accounted for when determining what vehicle to recommend to the customer 110. By way of example, if the customer 110 takes two routes, "ROUTE A" and "ROUTE B," and "ROUTE A" is taken 10% of the time while "ROUTE B" is taken 90% of the time, the route categorization score 318 can be multiplied by "0.1" for "ROUTE A" and "0.9" for "ROUTE B," with the result that the route categorization score 318 will be weighted more heavily with the values associated with "ROUTE B" than "ROUTE A," such that vehicles more suited to "ROUTE B" will be recommended to the customer 110.

In one embodiment, once the compute module 304 performs its functions, the compute module 304 can pass control, the route categorization score 318, and the route information 314 to the categorization module 306 for further processing. The categorization module 306 enables the generation of groups or clusters based on the route categorization score 318. The groups or clusters represent customers that are similarly situated with respect to the driving conditions they typically encounter. In one embodiment, the groups or clusters can be pre-determined as will be explained further below.

The categorization module 306 can generate the groups or clusters in a variety of ways and through a variety of techniques. In one embodiment, the groups or clusters can be generated based on a classification process. The classification process refers to any technique that can be used to group data. For example, the classification process can be implemented using a K-Means Clustering, Mean-Shift Clustering, Density-Based Spatial Clustering of Applications with Noise, Expectation-Maximization Clustering using Gaussian Mixture Models, Agglomerative Hierarchical Clustering, or other techniques used to group data. For example, in one embodiment, the route categorization score 318 can be put through a K-Means Clustering process such that the result is a data point representing the vector or data structure that is mapped to an "N"-dimensional space, where "N" represents an integer. The mapping can be performed for each customer 110 for which there is a travel history log 312.

In one embodiment, once the mapping is performed the categorization module 306 can generate a distribution of data points in the "N"-dimensional space. In one embodiment, the distribution of data points can be grouped based on a custom and pre-determined categorization of the data points. For example, it can be pre-determined by an administrator of the system 100 that clusters or groups falling within a certain region of the "N"-dimensional space or closely related points in the "N"-dimensional space are to be categorized as representing customers that drive on roads with a large number of accidents as compared to a threshold value, on roads that have "SEVERE" weather conditions, on roads that are "NEW," as examples. Such categorizations can be used to create segments of customers that are similarly situated. Such segments constitute the groups or clusters.

In one embodiment, once the categorization module 306 generates the groups or clusters based on the route categorization score 318, the categorization module 306 can store the groups or clusters in a further storage, such as a database, repository, list, table, or combination thereof. The storage can be implemented with similar technologies as the storage unit 206 or the database 310.

Continuing with the example, in one embodiment, once categorization module 306 performs its functions, the categorization module 306 can pass the groups or clusters, the route information 314, or a combination thereof to the recommendation module 308. The recommendation module 308 enables recommendations of vehicles for the customer 110 based on the groups or clusters and the route information 314. By way of example, in one embodiment, the groups or clusters can be associated with a particular vehicle or set of vehicles that are pre-determined to meet the needs of the group or cluster. For example, it can be pre-determined that routes involving "HEAVY" traffic are better suited for fuel efficient vehicles, while routes involving "POOR" road conditions are better suited for trucks or 4-wheel drive vehicles. Thus, in one embodiment, the groups or clusters of customers associated with "HEAVY" traffic, "POOR" road conditions, or a combination thereof can have vehicles suited for those conditions recommended to them by the recommendation module 308 based on what group or cluster they fall into in the "N"-dimensional space. Similar vehicle associations can be made for other conditions based on the route information 314.

In one embodiment, the recommendation module 308 can make the recommendation by, for example, accessing a list, storage, database, repository, or a combination thereof with the vehicle associations to the route conditions and comparing what group or cluster the customer 110 falls under with the associations in the list, storage, database, repository, or combination thereof to match which vehicles will be suited for the customer 110. Such comparison can be done, for example, using a look up table to map the vehicles to the grouping or clusters.

In one embodiment, the recommendation module 308 can further filter the vehicles recommended based on one or more instances of route information 314. For example, in one embodiment, the recommendation module 308 can remove any vehicles from the list of vehicles to be recommended based on the number of accidents involving those vehicles on a particular route that the customer 110 takes frequently. For example, if it is determined that the customer 110 takes "ROUTE A" frequently, and it is determined that two vehicles "VEHICLE 1" and "VEHICLE 2" are particularly well suited for "ROUTE A," however, based on the route information 314 there have been a number of accidents involving "VEHICLE 1" on "ROUTE A," above a threshold value indicating an abnormally high number of accidents involving "VEHICLE 1," the recommendation module 308 can remove "VEHICLE 1" as a recommended vehicle for the customer 110. In this manner, the recommendation module 308 can further filter the recommendation based on a vehicle make or model to further recommend vehicles for the customer 110. The aforementioned is merely an example, and in other embodiments the recommendation module 308 can filter vehicles based on other criteria such as the number of vehicle thefts along the route, the number of vehicles that have malfunctioned along the route, the number of deaths involving a particular vehicle along the route, or any other route information 314 that can be obtained and can be linked to or associated with a particular vehicle make or model. The list of vehicles can also be filtered based on cost.

In one embodiment, the recommendation module 308 can further enable a policy recommendation 322. The policy recommendation 322 refers to a recommendation for a coverage or a funding related to the vehicle recommended to the customer 110. For example, in one embodiment, the policy recommendation 322 can be a loan amount, an interest amount, an insurance premium, or a combination thereof, as examples for the recommended vehicle. In one embodiment, the recommendation module 308 can make the policy recommendation 322 based on accessing a list, table, or repository with, for example, amounts of loans, interest rates, or insurance premiums that are pre-determined based on vehicle makes or models.

By way of example, in one embodiment, once the recommendation module 308 determines what vehicles suits the driving needs of the customer 110, the recommendation module 308 can further access a policy repository 320 containing a list, table, database entries, or a combination thereof of pre-determined amounts of loans, interest rates, insurance premiums, or a combination thereof as examples, associated with the vehicles recommended. The policy repository 320 refers to any storage or repository storing the information or data about the loans, interest rates, insurance premiums, or a combination thereof as examples. The policy repository 320 can be implemented using the same technologies as the storage unit 206 or database 310. In one embodiment, the recommendation module 308 can, based on a table lookup, determine the amounts of loans, interest rates, or insurance premiums that should be recommended to the customer 110 and recommend the same as the policy recommendation 322 to the customer 110.

In one embodiment, once the recommendation module 308 determines which vehicles or policies to recommend to the customer 110, the recommendation module 308 can store the vehicle recommendations, the policy recommendation 322 or a combination thereof in a storage, for example the storage unit 206 of a device of the system 100, for example the first device 102 or the second device 106. In one embodiment, the recommendation module 308 can further send the vehicle recommendation and the policy recommendation 322 for display on an interface, for example the display interface 214 of a device of the system 100, for example the first device 102 or the second device 106 to be displayed for the customer 110 such that the customer 110 can determine which vehicles and policy recommendations 322 are most relevant for the customer 110 based on which routes the customer 110 takes frequently.

In one embodiment, the control flow 300 described above can be implemented as part of a machine learning process. The machine learning process refers to an algorithm or statistical model that computer systems use to perform a specific task without using explicit instructions, relying on patterns and inference instead. The machine learning process can be supervised or unsupervised. Specifically, by performing the groupings or clustering as described above for customers using the travel history log 312 and the route information 314, the control flow 300 can generate training data such that segments of customers can be identified that form the basis of the recommendations made by the recommendation engine for further customers. Upon generating the training data, the same control flow 300 can be performed to make vehicle recommendations for the further customers based on the groupings or clustering as described above.

It has been discovered that the methods, modules, units, and components implementing the above described system 100 significantly improves the ability of computers to recommend products to customers, specifically vehicles, by allowing the computer to determine, based on analyzing customer 110 driving patterns, what vehicles meet the needs of the customer 110 without the need for human intervention. It has been further discovered that the system 100 significantly improves the ability of computers to make recommendations to consumers based on improving a computer's ability to detect patterns and behaviors otherwise not apparent to humans by analyzing the travel history 112 and the route information 314 associated with the customer 112. It has been further discovered that the system 100 significantly improves a computer's ability to provide targeted and relevant recommendations to customers such that computers and resources can be efficiently used when recommending products and reducing the need to generate unnecessary data by for example merchants when marketing or advertising products to customers.

The system 100 has been described with module functions or order as an example. The system 100 can partition the modules differently or order the modules differently. For example, the software 210 can include the modules for the system 100. As a specific example, the software 210 can include the receive module 302, the compute module 304, the categorization module 306, and the recommendation module 308, and associated sub-modules included therein.

The control unit 202 can execute the software 210 to operate the modules. For example, the control unit 202 can execute the software 210 to implement the receive module 302, the compute module 304, the categorization module 306, and the recommendation module 308, and associated sub-modules included therein.

Moreover, while the modules are described as being executed in a particular order in the embodiments described above, this is merely exemplary. The order can be changed as understood by a person of ordinary skill in the art reading this disclosure, and can contain intervening steps, not discussed for the purposes of ease of description and to simplify this disclosure, to implement the recommendation engine.

The modules described in this application can be implemented as instructions stored on a non-transitory computer readable medium to be executed by the control unit 202. The non-transitory computer readable medium can include the storage unit 206. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system 100 or installed as a removable portion of the system 100.

Figure 4:
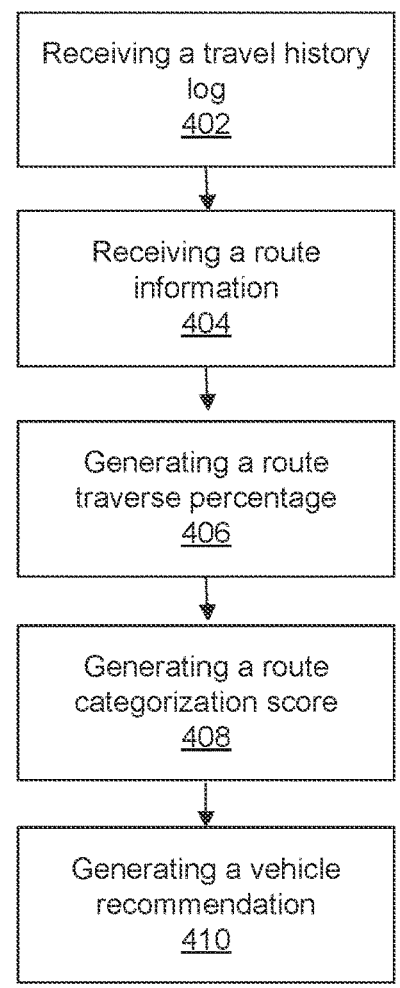
FIG. 4 is an example method of operating the recommendation engine according to an embodiment.

FIG. 4, shows an example method 400 of operating the recommendation engine according to an embodiment.

In step 402, a travel history log 312 is received from a device (such as the first device 102). In one embodiment, the travel history log 312 includes a route traversed by a customer 110. For example, travel history log 312 can be received by a communication unit (such as the communication unit 216) of a second device (such as the second device 106) via a communication path (such as the communication path 104).

In step 404, a route information 314 can be received from a database (such as database 310) for the route. In one embodiment, the route information 314 can include an accident history for the route. For example, the route information 314 can be received by the communication unit 216 of the second device 106 via the communication path 104.

In step 406, a route traverse percentage 316 can be generated based on the travel history log 312. The route traverse percentage 316 can be generated by a module of the system 100 (for example the compute module 304).

In step 408, in one embodiment, a route categorization score 318 can be generated based on the accident history for the route and the route traverse percentage 316. In one embodiment, the route categorization score 318 can be generated by the compute module 304.

In step 410, a vehicle recommendation can be generated based on the route categorization score 318. The vehicle recommendation can be generated (by for example, the recommendation module 308) after a categorization is performed (by for example, the categorization module 306).

The above steps 402 to 410 can be performed by having the control unit 202 of the second device 106 execute the software 210 implementing the functions and modules described above.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another important aspect of an embodiment of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the recommendation engine, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method comprising:
   receiving, by one or more computing devices, a travel history log from a database, wherein the travel history log includes a route traversed by a user;
   receiving, by the one or more computing devices, a route information from the database for the route, wherein the route information includes risk information for the route;
   generating, by the one or more computing devices, a route traverse percentage based on the travel history log;
   generating, by the one or more computing devices, a route categorization score based on the risk information for the route and the route traverse percentage;
   generating, by the one or more computing devices, a mapping of the route categorization score to a point in an N-dimensional space based on a computer implemented classification process, where N is greater than 3; and
   generating, by the one or more computing devices, a policy recommendation to the user based on where the mapped route categorization score falls within the N-dimensional space.

2. The computer-implemented method of claim 1, wherein the policy recommendation is for one of: a loan amount, an interest amount, or an insurance premium.

3. The computer-implemented method of claim 1, further comprising:
   accessing, by the one or more computing devices, a repository of pre-determined loan amounts, interest amounts, or insurance premiums associated with the vehicle recommended; and
   retrieving, by the one or more computing devices, the policy recommendation from the repository.

4. The computer-implemented method of claim 3, further comprising:
   performing, by the one or more computing devices, a table lookup to retrieve the policy recommendation from the repository.

5. The computer-implemented method of claim 1, further comprising:
   transmitting, by the one or more computing devices, the policy recommendation for display on a display interface of a computing device.

6. The computer-implemented method of claim 1, wherein the risk information further includes a vehicle information including a vehicle model of a vehicle involved in an accident on the route.

7. The computer-implemented method of claim 6, wherein generating the vehicle recommendation further includes generating the vehicle recommendation to not include the vehicle model if the vehicle model is involved more than a threshold number of accidents on the route.

8. A non-transitory computer readable medium including instructions that when processed by a computing system cause the computing system to perform operations comprising:
   receiving, by one or more computing devices, a travel history log from a database, wherein the travel history log includes a route traversed by a user;
   receiving, by the one or more computing devices, a route information from the database for the route, wherein the route information includes an risk information for the route;
   generating, by the one or more computing devices, a route traverse percentage based on the travel history log;
   generating, by the one or more computing devices, a route categorization score based on the risk information for the route and the route traverse percentage;
   generating, by the one or more computing devices, a mapping of the route categorization score to a point in an N-dimensional space based on a computer implemented classification process, where N is greater than 3; and
   generating, by the one or more computing devices, a policy recommendation to the user based on where the mapped route categorization score falls within the N-dimensional space.

9. The non-transitory computer readable medium of claim 8, wherein the policy recommendation is for one of: a loan amount, an interest amount, or an insurance premium.

10. The non-transitory computer readable medium of claim 8, wherein the operations further comprise:
    accessing, by the one or more computing devices, a repository of pre-determined loan amounts, interest amounts, or insurance premiums associated with the vehicle recommended; and
    retrieving, by the one or more computing devices, the policy recommendation from the repository.

11. The non-transitory computer readable medium of claim 8, wherein the operations further comprise:
    performing, by the one or more computing devices, a table lookup to retrieve the policy recommendation from the repository.

12. The non-transitory computer readable medium of claim 8, wherein the operations further comprise:
    transmitting, by the one or more computing devices, the policy recommendation for display on a display interface of a computing device.

13. The non-transitory computer readable medium of claim 8, wherein the risk information further includes a vehicle information including a vehicle model of a vehicle involved in an accident on the route.

14. The non-transitory computer readable medium of claim 13, wherein generating the vehicle recommendation further includes generating the vehicle recommendation to not include the vehicle model if the vehicle model is involved more than a threshold number of accidents on the route.

15. A computing system comprising:
    a memory configured to store instructions;
    a processor, coupled to the memory, configured to process the stored instructions to:
       receive a travel history log from a database, wherein the travel history log includes a route traversed by a user;
       receive a route information from the database for the route, wherein the route information includes an risk information for the route;
       generate a route traverse percentage based on the travel history log;
       generate a route categorization score based on the risk information for the route and the route traverse percentage;
       generate a mapping of the route categorization score to a point in an N-dimensional space based on a computer implemented classification process, where N is greater than 3; and
       generate policy recommendation to the user based on where the mapped route categorization score falls within the N-dimensional space.

16. The computing system of claim 15, wherein the policy recommendation is for one of: a loan amount, an interest amount, or an insurance premium.

17. The computing system of claim 15, wherein the processor is further configured to:
   access a repository of pre-determined loan amounts, interest amounts, or insurance premiums associated with the vehicle recommended; and
   retrieve the policy recommendation from the repository.

18. The computing system of claim 15, wherein the processor is further configured to perform a table lookup to retrieve the policy recommendation from the repository.

19. The computing system of claim 15, further comprising a communications unit including microelectronics, coupled to the memory, configured to transmit the policy recommendation for display on a display interface of a computing device.

20. The computing system of claim 15, wherein:
   the risk information further includes a vehicle information including a vehicle model of a vehicle involved in an accident on the route, and
   generating the vehicle recommendation further includes generating the vehicle recommendation to not include the vehicle model if the vehicle model is involved more than a threshold number of accidents on the route.

* * * * *